United States Patent [19]
Mitsuishi et al.

[11] 3,863,741
[45] Feb. 4, 1975

[54] CONTROL SYSTEM FOR WINDING POWER SUPPLY CABLE

[75] Inventors: Yoshiji Mitsuishi, Midori-ku, Yokohama; Toru Aihara, Sagamihara, both of Japan

[73] Assignee: Caterpillar Mitsubishi Ltd., Tokyo, Japan

[22] Filed: Apr. 15, 1974

[21] Appl. No.: 460,776

[30] Foreign Application Priority Data
Apr. 13, 1973 Japan.............................. 48-43774

[52] U.S. Cl........... 191/12.2 A, 242/75.51, 318/226
[51] Int. Cl................................................ H02g 11/00
[58] Field of Search................. 191/12.2 R, 12.2 A; 318/226; 242/75.51; 254/150 R, 166, 172, 173 R

[56] References Cited
UNITED STATES PATENTS
2,763,825  9/1956  Gibson.............................. 318/226
3,632,906  1/1972  Aihara........................ 191/12.2 A

*Primary Examiner*—Lloyd L. King
*Assistant Examiner*—D. W. Keen
*Attorney, Agent, or Firm*—Phillips, Moore, Weissenberg, Lempio & Strabala

[57] ABSTRACT

Improved service life for the electrical cable supplying power for electrically driven vehicles can be achieved by employing a torque drive motor on the cable reel assembly which is a multiphase motor which is connected to the power source with a delta-connection when the vehicle is in a reverse mode and a Y-connection when it is in a forward mode, thereby reducing the tension on the cable in the latter mode.

3 Claims, 5 Drawing Figures

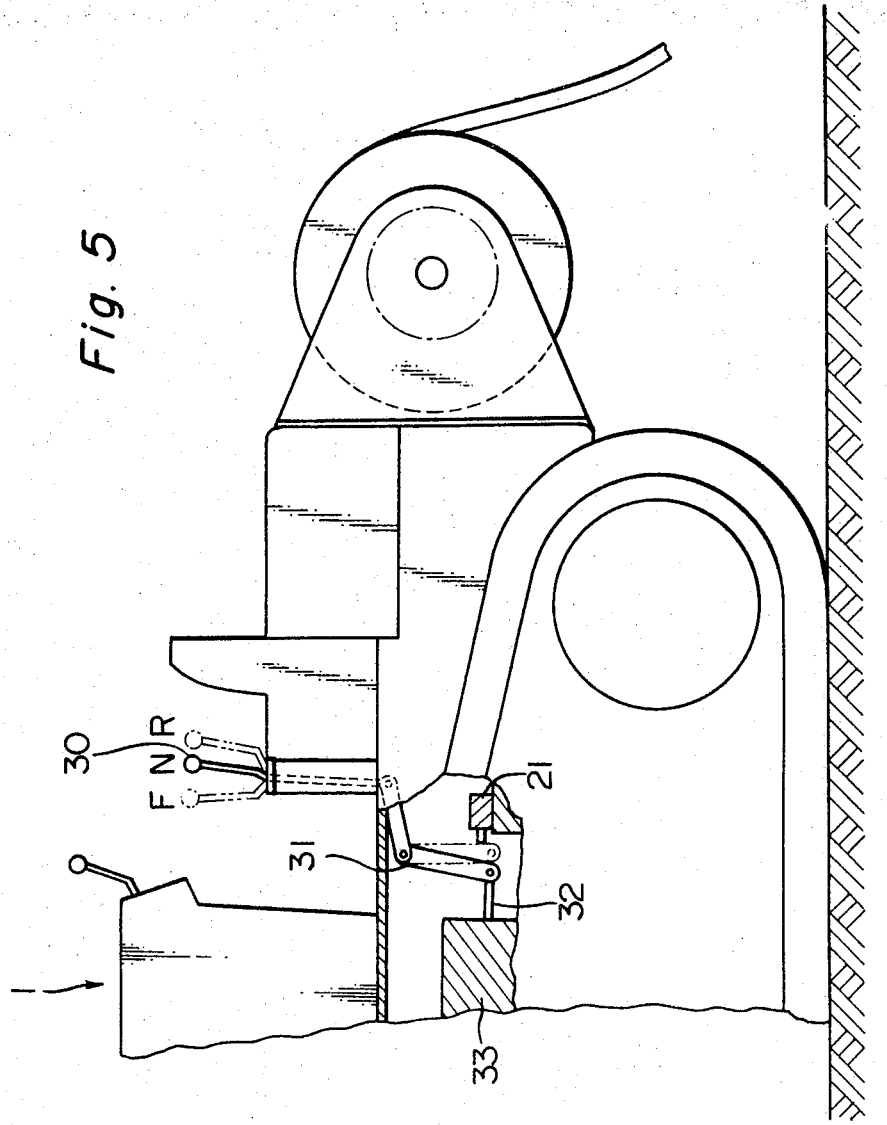

CONTROL SYSTEM FOR WINDING POWER SUPPLY CABLE

BACKGROUND OF THE INVENTION

The present invention relates to control system for winding and unwinding a power supply cable for use in an electrically driven earthmoving machine.

An electrically driven earthmoving machine of U.S. Pat. No. 3,632,906 is shown with a reel assembly for winding and unwinding a power supply cable and a three-phase induction torque motor for driving the reel assembly to maintain the cable under tension at all times when both winding and unwinding the cable from the reel.

In this arrangement, when the machine moves backward, the reel assembly requires a comparatively higher torque to wind the cable and maintain tension than when the machine advances. In the latter situation, a comparatively lower torque will hold the tension on the cable as the output torque of an electric torque motor usually becomes higher in the direction of the normal rotation (winding) than when reverse rotation occurs (unwinding).

For this reason, when the machine moves foward, a situation where a torque motor reverses, the cable is subjected to an excessive tension. The problem is acute, particularly when the machine starts suddenly and the cable condition changes from a relaxed state to tension and sometimes whips so much as to contact operators on the back of the machine. This exposes the operators to danger as the machine moves forward because the operator's attention is directed to the front, so he is unaware of the whip of the cable. When operations are conducted in such a comparatively narrow space as a tunnel, they become all the more dangerous.

In order that the aforesaid problem may be solved, attempts have been made to lower voltage of power supplied to the torque motor when the machine advances with the use of a transformer and decrease the output torque of the torque motor. However, installation of a transformer makes a control mechanism for a torque motor bulky and expensive. Also, changes of voltage of power supplied to a torque motor have also been effected with the use of resistance, but this causes power loss and complicated control circuits.

An object of the present invention is to prevent cable damage due to excessive tension when the machine moves forward.

Another object of the present invention is to provide an automatic change of the electrical connection of a torque motor supplied by an electric source into a Y-connection and delta connection system with reference to the direction of the machine, and thereby reduce the output torque of the torque motor driving the reel assembly at the time of advance of the machine.

Other objects of the present invention will be obvious as the following description of the invention unfolds when taken in conjunction with the drawings.

SUMMARY OF THE INVENTION

According to the present invention, the problem has been solved with a simple construction. In a reel assembly where a conventional three-phase induction torque motor is used in winding a cable and is ordinarily connected to an electrical source by a delta connection type, the present invention employs a change where the three-phase induction motor is connected to an electrical source by a Y-connection type when the machine is advancing or going forward and by a delta connection system when it moves backward, with switching means to effect the change. This alternate connection of the three-phase induction motor to the electrical source lowers voltages to be impressed to each winding of the torque motor as the machine advances by virtue of the Y-connection system, thereby reducing the output torque of the torque motor.

More specifically, according to the present invention there is provided a control system for reel assembly winding and unwinding a power supply cable of an electrically powered earth-moving machine, wherein the reel assembly for winding the cable employs a three-phase induction torque motor mechanically driving the reel assembly for winding the cable that includes a first contact means connecting the torque motor to a three-phase AC electrical source by a delta connection type and a second contact means connecting the torque motor to the three-phase AC electrical source by the Y-connection type with the control circuit actuated by the changeover means to selectively actuate the first and the second contact means when the machine moves forward or backward, whereby the torque motor is connected to the electric source by the Y-connection type when the machine moves forward and by the delta connection type when it moves backward.

BRIEF DESCRIPTION OF THE DRAWINGS

FIG. 5 is a schematic diagram showing the mechanical structure of the control system of the present invention.

DESCRIPTION OF THE PREFERRED EMBODIMENT

Figure 1:
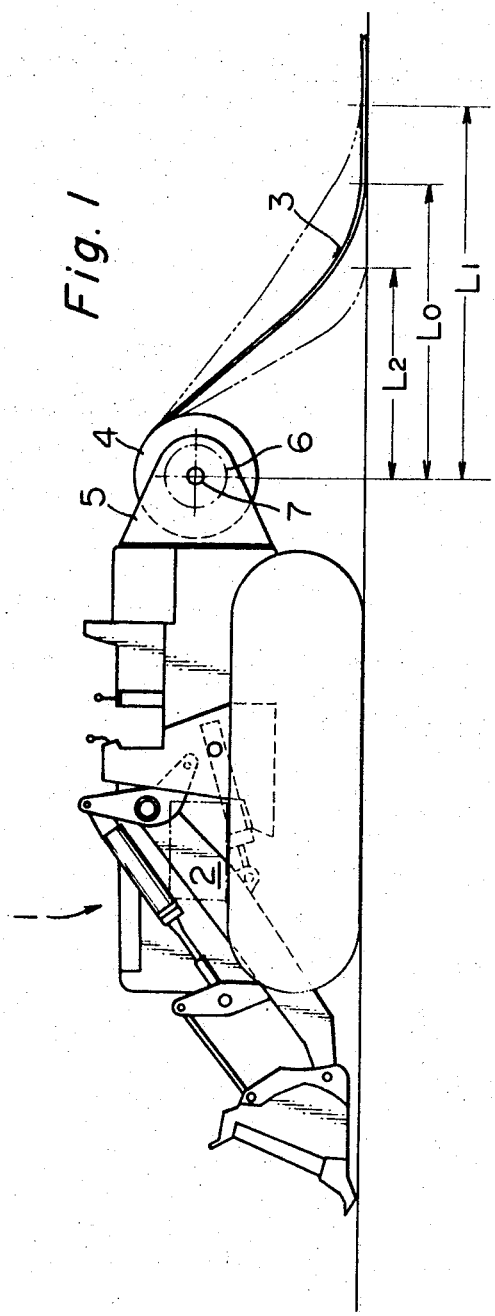
FIG. 1 is a schematic diagram of an electrically-powered earthmoving machine.

In FIG. 1, an earthmoving machine 1 is shown with driving main motor 2, which is powered by electricity supplied through cable 3. Cable 3 is wound and unwound on reel 4 disposed at the rear of the machine 1 as it advances and reverses. Reel 4 is rotatably supported on shaft 7 mounted on a pair of supporter plates 5 projecting from the rear of the machine. Reel 4 is mechanically driven with the torque motor 6 that is mounted on plates 5 with an appropriate member such as a chain. Motor 6 may be a three-phase induction motor of a squirrel-cage rotor type or that of a wound-rotor type. Reel 4 may be located above the machine, if desired.

During the operations of machine 1, torque motor 6 is always driving reel 4 in a cable "wind" direction. Hence when machine 1 moves backward (to right in FIG. 1), reel 4 rotates, due to the output torque of the torque motor, to wind cable 3.

When machine 1 moves forward (to left in FIG. 1), reel 4 rotates clockwise, against the output torque of torque motor 6, to unwind cable 3.

Figure 2:
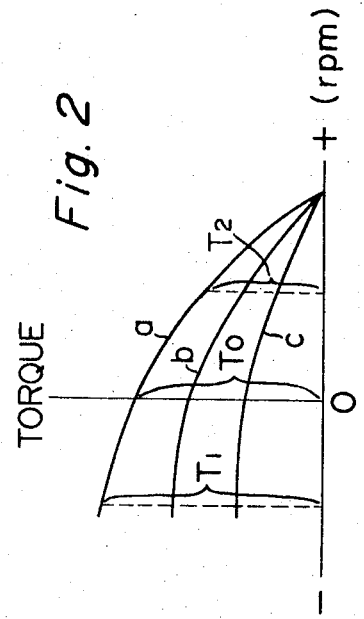
FIG. 2 is a graph showing the relationship of the output torque and the number of rotations of a torque motor and service voltage.

The relationships between the output torque of the torque motor and the number of rotations (normal and reverse rotations) are illustrated in FIG. 2. Where a constant service voltage is employed, the output torque in the normal "wind" rotation (range of +) is much less than it is in the reverse "unwind" rotation (range of −). Various service voltages for the torque motor and relative output torque are indicated by lines $a$, $b$ and $c$.

When machine 1 moves backward, torque motor 6 makes normal "wind" rotations in rpm such as $N_2$ almost proportional to advancing speeds of the machine. When the machine moves forward, torque motor 6 makes reverse unwind rotations in rpm such as $N_1$. If the torque motor is powered in both conditions at constant voltage, for instance the voltage of line $a$, the output torque $T_2$ at the time the machine is in a reverse mode is lower than stalling torque $T_o$ as well as the output torque $T_1$ at the time of advance of the machine in a forward mode which is higher than stalling torque $T_o$. That is, $T_1 > T_o > T_2$.

As a result, the horizontal distance between the center of reel 4 and the contact of cable 3 with ground varies; $L_1$ is the distance at the time of advance of the machine and is longer than distance $L_o$ at the stop condition and distance $L_2$ at the time the machine is moving backward.

Thus there is an application of excessive tension on cable 3 at the time of advance of the machine which is undesirable, and if a lower service voltage is employed at all times when the machine moves backward, the torque is so low as to make cable winding more difficult.

The inventors have found it advantageous to make voltage supplied to the torque motor at the time of advance of the machine lower than the voltage supplied when the machine moves backward in order to solve the aforesaid difficulties. The control system of the present invention is thus arranged so that an output torque of the torque motor varies as indicated by solid lines in FIG. 3 by changing the electrical connection of the torque motor and the electrical power source.

Figure 3:
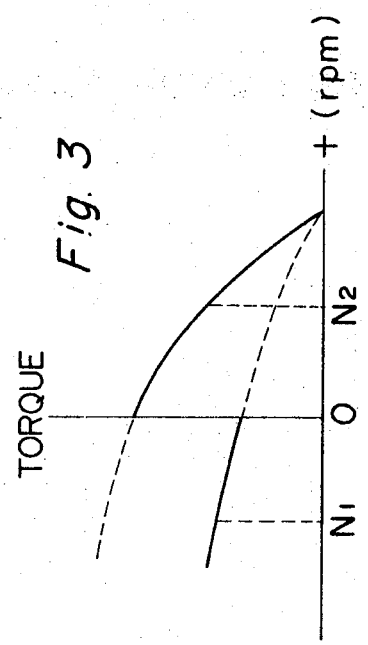
FIG. 3 is a graph showing the relationships between the output torque and the number of rotations of a torque motor when using the present invention.
Figure 4:
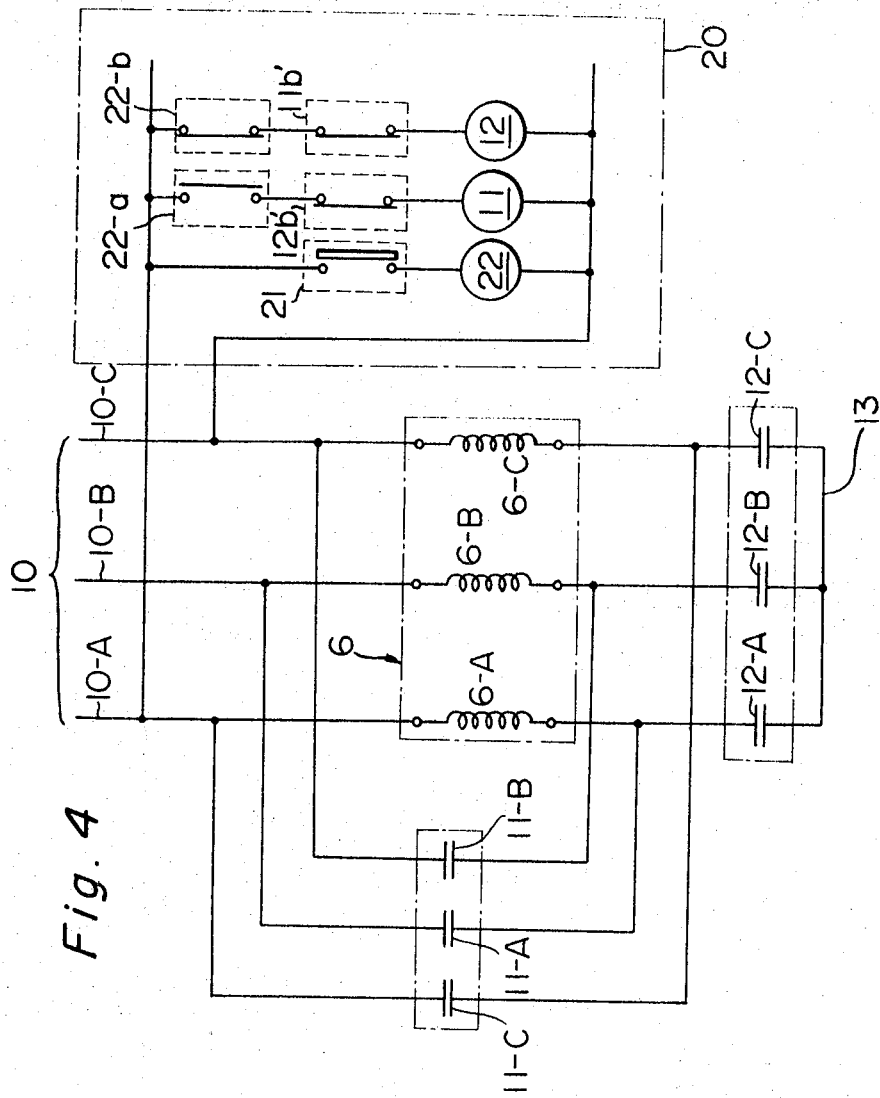
FIG. 4 is an electrical circuit of the control system of the present invention.

FIG. 4 shows an embodiment of a circuit diagram of the control system of the present invention. In FIG. 4, ends of three windings 6-A, 6-B and 6-C of a torque motor 6 are connected to three wires 10-A, 10-B and 10-C of a three-phase AC electric source 10, respectively. Wires 10-A, 10-B and 10-C are connected to a three-phase AC electric source remote from the machine via cable 3 (shown in FIG. 3). The three wirings 6A, 6B and 6C are connected to wires 10-A, 10-B and 10-C via normally open relay contacts 11-A, 11-B and 11-C for a delta connection. Also, the other ends of wirings 6-A, 6-B and 6-C are connected respectively to common wire 13 through normally open relay contacts 12-A, 12-B and 12-C for forming a Y-connection type.

A control circuit 20 actuates selectively three normally open contacts 11-A, 11-B and 11-C for formation of a delta connection or alternatively the normally open contacts 12-A, 12-B and 12-C for forming a Y-connection type is shown. In control system 20, normally open limit switch 21 is actuated with shift lever 30 for forward and backward movements of machine 1 (later described) and is connected to electric source 10 via relay 22. Relay 11 for actuating normally closed relay contacts 11-A, 11-B and 11-C is connected to the electric source through contacts 12-$b'$ and normally open relay contacts 22-$b$. Relay 12 for actuating relay contacts 12-A, 12-B and 12-C is connected to an electric source via normally closed relay contact 11-$b'$ and normally closed relay contact 22-$b$.

In FIG. 5, shift lever 30 for changing the moving direction of machine 1 is connected to gear box 33 via link 31 and rod 32. The aforesaid limit switch 21 is positioned so that it is actuated with the movement of shift lever 30. That is, limit switch 21 is disposed so as to be actuated with link 31 as shift lever 30 has been shifted from netural position N to reverse position R. Consequently, limit switch 21 is closed when shift lever 30 is positioned in reverse position R and opened when it is in forward position F and neutral position N.

The function of the control system of the present invention will be described below.

When shift lever 30 has been shifted from forward position F or neutral position N into reverse position R, link 31 of shift lever 30 impinges on limit switch 21 to close the limit switch. As a result, in FIG. 4, relay coil 22 is excited to close normally open related contacts 22-$a$ and open normally closed contacts 22-$b$. As normally closed relay contacts 22-$b$ are opened, relay coil 12 is deenergized, and consequently normally open relay contacts 12-A, 12-B and 12-C for forming a Y-connection type are opened. At the same time, normally closed contacts 12$b'$ are closed and an electric current flows into relay coil 11 via contacts 22-$a$ and 12-$b'$. When relay coil 11 is energized, normally open relay contacts 11-A, 11-B and 11-C for forming Y-connection types are closed. Thus a delta connection will be formed between windings 6-A, 6-B and 6-C of torque motor 6 and electrical source 10 at this time.

When shift lever 30 has been shifted from reverse position R to forward position F or neutral position N, link 31 separates from limit switch 21 to open limit switch 21. As a result, relay coil 22 is deenergized, normally open contacts 22-$a$ are opened are opened and normally closed contacts 22-$b$ are closed. Relay coil 11 is then deenergized and relay contacts 11-A, 11-B and 11-C are opened at which time normally closed contacts 11$b'$ are closed and an electrical current is supplied to relay coil 12 via contacts 22-$b$ and 11-$b'$. Accordingly, if relay coil 12 is energized, normally open contacts 12-A, 12-B and 12-C are closed. A Y-connection is thus formed between each of windings 6-A, 6-B and 6-C of torque motor 6 and electrical source 10.

The relationship between voltage V in the delta connection and voltage $V_Y$ in the Y-connection is known by the following formula:

$$V = V \sqrt{3\, V_Y}$$

For this reason, an output torque of the torque motor when the machine moves forward is lowered as indicated by solid lines in FIG. 3 as compared with the conventional circumstance.

The present invention has been embodied in the form illustrated in the accompanying drawings, but attention is called to the fact, however, that changes may be made in the specific construction without departing from the scope. For instance, control circuit 20 in FIG. 4 may be replaced by various types of circuits having a similar function and shift lever 30 in FIG. 5 may not move linearly but in the U-shaped form or connection systems of a torque motor which can be interchangeably constituted in the forward and reverse positions.

What is claimed is:

1. Control system for winding and unwinding a power supply cable for an electric-powered earthmoving or construction machine, comprising a reel assembly for winding the cable, a three-phase induction torque motor mechanically connected to drive said reel assembly, first contact means of connecting the torque motor to a three-phase AC electric source by a delta connection type, said contact means of connecting said torque motor to said three-phase AC electric source by a Y-connection type and a control circuit arranged to be actuated with changeover means for directional control of the machine, for alternately and selectively actuating the first and second contact means whereby said torque motor is connected to the electric source by the Y-connection type when the machine moves forward and by the delta connection type when it moves backward.

2. Control system as set forth in claim 1 wherein the control circuit is provided with a limit switch to be actuated with the operation of the changeover means, a first relay for actuating the first contact means and a second relay to actuate the second contact means whereby when the changeover means is positioned in the reverse position of the machine, said limit switch energizes said first relay which actuates the first contact means and when said changeover means is positioned in the forward position of the machine, said limit switch energizes said second relay and actuates said second contact means.

3. Control system as set forth in claim 2 wherein when the changeover means is positioned in the neutral position of the machine, the limit switch energizes the second relay and actuates the second contact means.

* * * * *